Dec. 15, 1970  F. E. SWINDELLS ET AL  3,547,700

SOLID STATE BATTERY CELLS

Filed March 12, 1969

INVENTORS
WILLIAM R. LANIER
& FRANK E. SWINDELLS

BY *Hurvitz, Rose & Greene*

ATTORNEYS

United States Patent Office 3,547,700
Patented Dec. 15, 1970

3,547,700
SOLID STATE BATTERY CELLS
Frank E. Swindells, Arlington, and William R. Lanier, Chantilly, Va., assignors to Melpar, Inc., Falls Church, Va., a corporation of Delaware
Filed Mar. 12, 1969, Ser. No. 806,367
Int. Cl. H01m 35/00
U.S. Cl. 136—83                                             9 Claims

ABSTRACT OF THE DISCLOSURE

A solid state battery includes an electrolyte composed of two contiguous thin film layers of halides of the respective metals utilized as the electrodes of the battery. One of the electrolyte thin film layers is a halide salt of a divalent or higher valence metal doped with a halide salt of a monovalent metal. The monovalent metal has an ionic radius that most closely approximates, relative to the other monovalent metals, the ionic radius of the divalent or higher valence metal in the aforementioned one of the electrolyte layers. The electrodes are, like the electrolyte layers, of thin film construction.

BACKGROUND OF THE INVENTION

The present invention relates generally to electrical batteries, and more particularly to solid state batteries or cells composed of solid electrodes of thin film construction and of solid electrolytes capable of supporting ionic conduction through a crystal lattice structure.

Prior art proposals for fabricating solid state batteries have generally involved structures in which several solid tablets or disks forming electrode, electrolyte, and electrode are placed in overlying relationship and pressed together under relatively high pressure to produce adhesion of the several disks. A major problem associated with such a method is the poor contact between adjacent layers and the resulting high internal resistance of the cell. Frequently, the internal cell resistance is initially found to be less than a maximum tolerable value, but with aging of the cell or with decomposition under repeated cycles of charging and discharging, the layers begin to separate so that a marked increase in internal resistance occurs during the shelf life of the battery or with continuous use of the battery in an electrical circuit.

In addition to the mechanical adherence problem, the prior art solid state cells have lacked the microminiature physical dimensions required in some circuit applications, because of the nature of the processes by which they have been fabricated. While some proposals have been advanced to attempt fabrication using thin films of the necessary materials, further problems have arisen regarding compatibility of the materials in thin film form, effect of and suitability of substrate materials, maintenance of mechanical and electrical contact between the films during the expected useful life of the battery, maintenance of purity of composition during deposition if the films are to be fabricated by vacuum evaporation methods, pressures and temperatures necessary to obtain suitable films by vacuum evaporation, and a variety of less significant problems of fabrication.

Another major problem that has occurred in attempts to produce a usable solid state cell is the relatively large ionic resistance found to exist in solid electrolytic compositions using solid forms of standard electrolyte materials that are quite suitable in other states. As is well known, ionic conduction via a solid electrolyte occurs as a consequence of defects in the crystal lattice structure of the electrolyte. Accordingly, it has been suggested that further defects be incorporated in the lattice structure of the electrolyte by addition of a "defect" type impurity to the basic electrolyte or host material. In general, the "impurity" has been a metallic compound that contains a metal of higher valence, or within a higher group in the periodic table of the elements, than the valence of the metal within the host material.

It is a principal object of the present invention to provide improvements in the method of manufacture and in the ionic conductivity and electrical output of solid state cells.

As previously observed, significant problems reside in attempts to fabricate and utilize otherwise standard cell materials, in a thin film form. Accordingly, it is another broad object of our invention to provide improved methods of fabricating solid state cells in thin film form, and to provide improvements in electrolyte materials for use in solid state cells.

SUMMARY OF THE INVENTION

Briefly, the present invention resides in a battery cell having thin film metal electrodes between which is interposed an electrolyte comprising contiguous thin film layers of a halide of each of the metals of which the electrodes are composed, with each metal halide adjacent the electrode of corresponding metal. According to the invention, one of these electrolyte layers is a halide of a divalent or higher valence metal which is doped with up to 50 percent by weight of a monovalent metal compound. Generally, we have found that the most effective monovalent metal compound is a halide corresponding to the halide of the host material into which it is introduced.

As noted earlier, solid electrolyte cells of the prior art have had the disadvantage of high internal resistance primarily resulting from low ionic conductivity and poor mechanical and electrical contact between layers. According to our invention, the several thin film layers are deposited in successive overlying relationship by evaporation under high vacuum at temperatures and pressures, and with precautions regarding compositions to be evaporated, that will be set forth in detail in the description of the preferred embodiments. At present it may be observed that when solid electrolyte cells have an internal resistance of $10^5$ ohms or greater, the dominant mode of conduction is controlled or is greatly affected by leakage, impurities, and conduction paths that are sensitive to specific structural characteristics rather than to true bulk conductivity of the materials. Such factors may serve to explain the usual erratic variations of current and voltage of prior art solid electrolyte cells when in use. We have observed that in thin film cells without doping according to our invention, the internal cell resistance is on the order of $3 \times 10^5$ to $5 \times 10^5$ ohms per square centimeter, and that in bulk cells the internal resistance is on the order of $0.7 \times 10^5$ to $1.0 \times 10^5$ ohms per square centimeter. While open circuit potential and short circuit current (in amperes per square centimeter) may vary for each cell of miniature construction, we have found that thin film cells with non-doped electrolytes have an open circuit voltage generally ranging from 0.47 to 0.51 volt, have little useful power output, and have only about a 50 percent production yield of useful cells. Moreover, difficulty is experienced in charging some of these cells in that severe electrolyte breakdown may occur when a charging potential slightly above the open circuit voltage of the cell, e.g., greater by a few hundredths of a volt, is applied to the cell electrodes.

On the other hand, cells according to our invention in which the electrolyte includes a layer of lead chloride doped with one percent by weight of potassium chloride, for example, display internal resistances ranging from 1.0 to $1.5 \times 10^4$ ohms per square centimeter, or an order of magnitude lower than cells without dopant. Furthermore, such doped electrolyte cells can be charged with potentials exceeding by from .05 to .20 volt the open circuit potential of a nominally 0.49 (open circuit) volt cell. Also, the production yield of cells having a useful power output is up from about 50 percent to approximately 90 percent.

DESCRIPTION OF THE PREFERRED EMBODIMENTS

Figure 1:
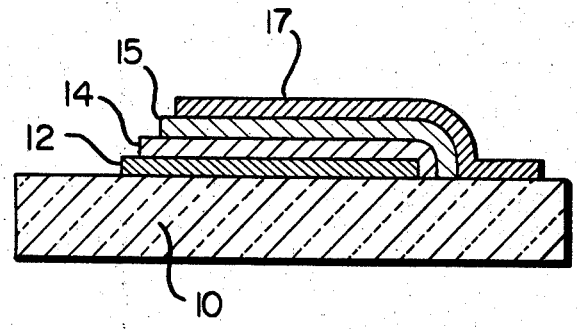
FIG. 1 is a cross-sectional view of a thin film form of a solid state cell according to the invention.

According to the invention, a solid state thin film battery or cell of the type shown in FIG. 1 is fabricated as follows. The substrate 10, which is preferably composed of borosilicate glass, quartz, ceramic, or plastic film such as polyester or polyimide, is initially outgassed at approximately 400° C. for from about 20 to about 30 minutes to render its surface more likely to promote adhesion of and direct continuous contact with a thin film electrode 12 to be deposited thereon. Suitable electrode materials include silver, magnesium, lead, cadmium, calcium, barium, and beryllium.

In a first example, silver is used as the material for electrode 12 and is preferred for its electrical conductivity and its capability of strongly adhering to any of the aforementioned substrate materials. The silver layer 12 is deposited to a thickness of approximately 1000 A. (angstroms) from a tantalum boat in a vacuum environment of about $10^{-5}$ torr., with the substrate temperature maintained at approximately 150° C.

An electrolyte layer 14 of silver chloride is then deposited to a thickness of approximately 2500 A. from a crucible composed of a material such as quartz, thoria or zirconia to prevent decomposition of the silver chloride during the evaporation process. It is desirable, for this reason, that the deposition of silver chloride be carried out from a crucible composed of material of the type specified, rather than from a tantalum or tungsten boat. The deposition of the AgCl layer 14 is also performed under vacuum conditions at the above-specified pressure, with the substrate temperature maintained at 125° C.

Layer 15 is an electrolyte layer which may vary in specific composition, but which is, according to the present invention, composed of a halide of a divalent or higher valence metal doped with from .01 percent up to 50 percent of monovalent metal halide by weight of total composition (in contrast with mole percent) of the electrolyte layer to be doped, with the dopant distributed through the layer. In the present example, layer 15 is composed of lead chloride doped with 1% by weight of potassium chloride. This layer is evaporated on silver chloride film 14 to a thickness of from 5,000 to 15,000 A. under the above-specified vacuum conditions, at a substrate temperature of 100° C. The lead chloride-potassium chloride composition may be deposited from a crucible or the type specified earlier, or from a tantalum boat. In any event, electrolyte layer 15 is preferably substantially thicker, e.g., up to about ten times thicker, than electrolyte layer 14, because of power considerations to be examined presently.

The cell is completed by depositing a layer 17 of electrode material, such as lead in the case of lead chloride as the primary constituent of electrolyte layer 15, evaporated from a tantalum boat under the specified vacuum pressure, to a thickness of about 1000 A. with the substrate temperature maintained at about 75° C. It will be noted that the substrate temperature is reduced during deposition of each successive layer, and this will be generally true for any specific composition of cell layers. It is essential, of course, that the two electrodes be separated throughout by the electrolyte and/or the substrate, as shown.

Upon completion of the above process, the thin film doped cell is in a charged state and may be stored for subsequent use, or utilized immediately without additional charging. Alternatively, the cell may be fabricated in an uncharged state by simply omitting the AgCl layer, which will appear in any event during electrolyte reaction accompanying charging of the cell. It is to be understood that no claim of invention is made for the general composition of the various layers without doping of the electrolyte. For example, Ag/AgCl/PbCl$_2$/Pb cells of bulk composition are well known in the art.

Figure 2:
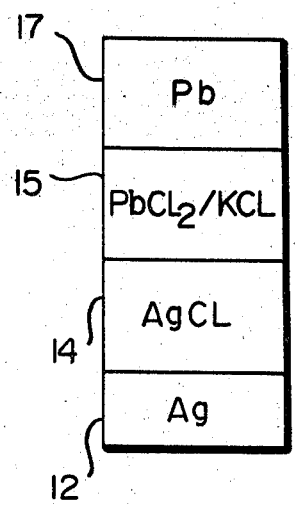
FIG. 2 is a schematic cross-section of a charged cell of the general type shown in FIG. 1, illustrating the relative positions of the layer boundaries therein.
Figure 3:
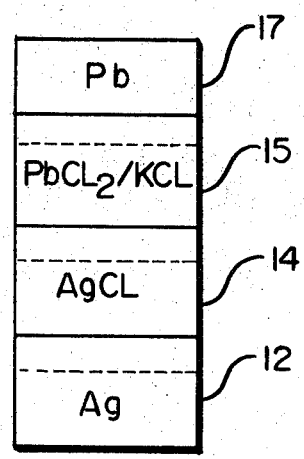
FIG. 3 is a schematic cross-section of a discharged cell of the type shown in FIG. 1, illustrating the shifts in layer boundaries during and following discharge of the cell.

Referring now to FIG. 2, the relative positions of the boundaries of the several layers of a charged cell are shown for the exemplary electrode and electrolyte materials described above. It is to be understood that the thickness of each individual layer is exaggerated in both FIG. 2 and FIG. 3, for the sake of clarity. When the cell is connected in an electrical circuit such that a path is completed from the cathode (Ag) 12 to the anode (Pb) 17 via an appropriate load, current flows through the circuit and there is a shift of the layer boundaries toward the anode end of the cell, as the cell discharges. This phenomenon is illustrated by the difference in location between the dashed and solid boundary lines in FIG. 3. The dashed lines represent the original boundaries between layers in a fully charged cell, and the solid lines represent the boundaries between layers of the cell when discharged. This boundary shift is explained by oxidation of the lead to lead chloride, with an accompanying reduction of the silver chloride to silver. As is to be expected, charging the cell reverses this shift of the boundaries back toward the silver (cathode) electrode. In the charging process, the silver is oxidized to silver chloride and the lead chloride is reduced to lead; the silver then becoming the anode and the lead the cathode.

It should be clear that the capacity of the battery cell expressed in ampere hours is dependent upon the amount of material available for transport, according to Faraday's law. In the example given above, the lead chloride layer and silver chloride layer must be sufficiently thick to provide the desired capacity, and this will hold for any materials of which the electrolyte layers may be composed. The required thickness of the layers to provide a desired cell capacity may be determined in accordance with the stoichiometric relation

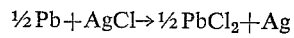

$$\tfrac{1}{2}Pb + AgCl \rightarrow \tfrac{1}{2}PbCl_2 + Ag$$

where one gram equivalent of the reactants is equivalent to 26.8 ampere hours capacity. The same approach to determine layer thicknesses may be followed for other cell materials.

Although thin film fabrication is preferred, it is not essential to obtain the reduction in cell internal resistance available using the teaching of the present invention. For example, cells may be fabricated using electrolyte materials in the molten state. As an illustration of such bulk fabrication using the exemplary cell materials set forth above, a lead electrode may be placed in a mold which is then covered with the lead chloride doped with 1% of potassium chloride, in molten form. The molten electrolyte layer is allowed to solidify, and the temperature of the bulk layers is held at approximately 275° C. while molten silver chloride is poured onto the doped lead chloride layer. The silver electrode is then heated to approximately 500° C. and placed in position on the silver chloride, when the latter has solidified. These advanced temperatures aid adherence of the adjacent layers to one another. When these steps are completed, the mold and the cell layers contained therein are allowed to cool, and the cell is then removed from the mold.

In another process of thin film construction, the AgCl may be fabricated as a thin self-supporting sheet, and then coated on one side with a thin film of silver, and on the opposite side with successive films of doped lead chloride and of lead. In this manner, continuous sheets of charged cell structure may be fabricated, and rolled up with a plastic insulating film (e.g., polyester) placed on one electrode surface prior to rolling to prevent direct electrical contact between opposite electrodes. Still further, a thin silver sheet may be used as the beginning layer, and may be partially converted on one side to AgCl by wet or dry chlorination. The other layers may then be coated successively on the AgCl layer.

Other examples of suitable compositions of electrolyte layer 15 are as follows. Magnesium chloride may be doped with from .01 percent to 50 percent of lithium chloride, by total weight of this part of the electrolyte. This will require the use of magnesium in place of silver for electrode layer 17. In general, it may be stated that the metal in the compound of which electrolyte layer 15 is composed is the metal to be used as the electrode 17 adjacent that electrolyte layer. Cadmium chloride doped with up to 50 percent by weight of sodium chloride, or calcium chloride doped with up to 50 percent by weight of sodium chloride, or barium chloride doped with up to 50 percent by weight of potassium chloride, or beryllium chloride doped with up to 50% by weight of lithium chloride, may alternatively be used for electrolyte layer 15. In general, the monovalent metal whose salt is to be utilized as the dopant is selected on the basis of its having an ionic radius most closely corresponding to the ionic radius of the divalent metal or higher valence metal whose halide is the principal constituent of electrolyte layer 15.

Figure 4:
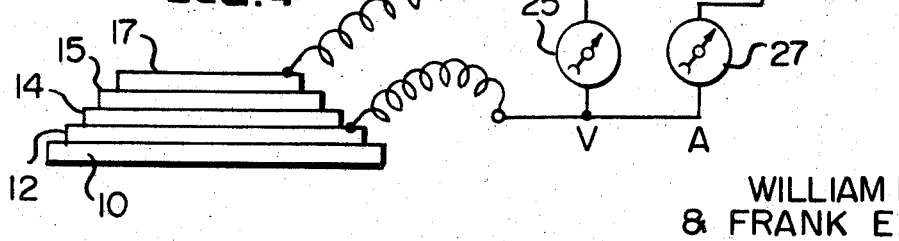
FIG. 4 is a schematic diagram of a circuit used for measurement of cell electrical characteristics.

Tests were performed on the cells using apparatus shown in FIG. 4. A voltmeter 25 is connected between electrodes 12 and 17, and a microammeter 27 is connected through a variable high resistance 28 across the voltmeter. Representative electrical characteristics of a typical cell in which magnesium chloride doped with lithium chloride was used as the electrolyte layer 15, are as follows:

| $R_t$ (28) | V (across 25) | I (through 27) |
|---|---|---|
| A (open) | 1.80 | 0 |
| 1.00 megohm | 1.75 | 1.5μa |
| 0.50 | 1.69 | 3.2 |
| 0.00 | 1.50 | 15.0 |
| 0.15 | 1.49 | 29.6 |
| 0.01 | 1.13 | 112.0 |

Because of sensitivity of the cells to ambient moisture they may be wrapped in protective insulative film (e.g., polyester), or may be encapsulated (as designated by dotted line 20 in FIG. 1), immediately after fabrication.

We claim:
1. A solid state electrical cell, comprising a pair of spaced-apart metal electrodes, and
   a solid electrolyte interposed between and in intimate contact with both said electrodes, said electrolyte comprising
   first and second superposed contacting layers, each layer comprising a halide of the metal of which the respective adjacent electrode is composed, one of the metals having a valence equal to or greater than two, the electrolyte layer positioned adjacent the last-named metal consisting essentially of said halide of said last-named metal doped with a monovalent metal salt in an amount up to 50 percent by weight of total components to that electrolyte layer.
2. The cell according to claim 1 wherein said monovalent metal salt is a halide of the monovalent metal said halide corresponding to the halide in which said monovalent metal salt is introduced as a dopant.
3. The cell according to claim 1 wherein said metal having a valence equal to or greater than two is selected from the group consisting of lead, magnesium, cadmium, calcium, barium, and beryllium.
4. The cell according to claim 3 wherein said monovalent metal is selected from the group consisting of potassium, lithium, and sodium.
5. The cell according to claim 4 wherein the other electrolyte layer is silver chloride.
6. The cell according to claim 4 wherein said monovalent metal is selected for a particular divalent or higher valence metal of the electrolyte layer to be doped, according to correspondence between their respective ionic radii.
7. The cell according to claim 1 wherein the doped electrolyte layer consists essentially of lead chloride doped with one percent by weight of potassium chloride.
8. The cell according to claim 1 wherein said doped electrolyte layer consists essentially of magnesium chloride doped with from .01 percent to 50 percent by weight of lithium chloride.
9. A thin film solid state battery comprising a silver electrode layer; a silver chloride electrolyte layer overlying said silver electrode layer; a further electrolyte layer comprising a halide of a metal having a valence equal to or greater than two, overlying said silver chloride electrolyte layer; said further electrolyte layer containing an amount from .01 percent to 50 percent by total weight of the further electrolyte layer, of a corresponding halide of a monovalent metal, to an extent that said further electrolyte layer consists essentially of the first-named metal halide and the monovalent metal halide distributed therein; and a further electrode layer of the metal of said first-named halide overlying said further electrolyte layer.

References Cited
UNITED STATES PATENTS

| | | | |
|---|---|---|---|
| 2,696,513 | 12/1954 | Lehovec | 136—83 |
| 3,134,698 | 5/1964 | Neipert et al. | 136—155XR |
| 3,375,135 | 3/1968 | Moulton et al. | 136—6 |
| 3,443,997 | 5/1969 | Argue et al. | 136—83 |
| 3,463,670 | 8/1969 | Rao et al. | 136—83 |
| 3,455,742 | 7/1969 | Rao | 136—83 |

ALLEN B. CURTIS, Primary Examiner

A. SKAPARS, Assistant Examiner

U.S. Cl. X.R.

136—6, 111